United States Patent
Sweetland

(10) Patent No.: US 7,056,139 B2
(45) Date of Patent: Jun. 6, 2006

(54) ELECTRICAL CONNECTOR

(75) Inventor: Matthew Sweetland, Bedford, MA (US)

(73) Assignee: Tribotek, Inc., Burlington, MA (US)

( * ) Notice: Subject to any disclaimer, the term of this patent is extended or adjusted under 35 U.S.C. 154(b) by 0 days.

(21) Appl. No.: 11/070,755

(22) Filed: Mar. 2, 2005

(65) Prior Publication Data

US 2005/0202695 A1    Sep. 15, 2005

Related U.S. Application Data

(63) Continuation-in-part of application No. 10/985,322, filed on Nov. 10, 2004, and a continuation-in-part of application No. 10/850,316, filed on May 20, 2004, and a continuation-in-part of application No. 10/603,047, filed on Jun. 24, 2003, now Pat. No. 6,951,465, which is a continuation-in-part of application No. 10/375,481, filed on Feb. 27, 2003, which is a continuation-in-part of application No. 10/273,241, filed on Oct. 17, 2002, now Pat. No. 6,942,496.

(60) Provisional application No. 60/348,588, filed on Jan. 15, 2002.

(51) Int. Cl.
  *H01R 12/00* (2006.01)
(52) U.S. Cl. .................. 439/296; 439/930; 439/67; 29/622; 29/825; 29/826; 29/829; 29/846; 29/850
(58) Field of Classification Search ............ 439/66–67, 439/259, 37, 91, 591, 482, 493, 329, 496, 439/930; 361/218; 174/117 M; 29/705, 29/622, 825–826, 829, 846, 850
  See application file for complete search history.

(56) References Cited

U.S. PATENT DOCUMENTS

| | | | |
|---|---|---|---|
| 1,012,030 A | 12/1911 | Underwood |
| 2,904,771 A | 9/1959 | Burtt et al. |
| 3,197,555 A | 7/1965 | Mittler |
| 3,257,500 A | 6/1966 | Rusch, Jr. et al. |
| 3,371,250 A | 2/1968 | Ross et al. |
| 3,495,025 A | 2/1970 | Ross |
| 3,631,298 A | 12/1971 | Davis |
| 3,639,978 A | 2/1972 | Schurman |
| 3,654,381 A | 4/1972 | Copp |
| 3,676,923 A | 7/1972 | Reimer |
| 3,702,895 A | 11/1972 | de Sio |
| 3,711,627 A | 1/1973 | Maringulov |
| 3,909,508 A | 9/1975 | Ross |
| 3,927,284 A | 12/1975 | Andersson |
| 3,984,622 A | 10/1976 | Ross |
| 4,082,423 A | 4/1978 | Glista et al. |
| 4,123,899 A | 11/1978 | Windelbandt et al. |
| 4,128,293 A | 12/1978 | Paoli |
| 4,206,958 A | 6/1980 | Hall et al. |
| 4,218,581 A | 8/1980 | Suzuki |

(Continued)

FOREIGN PATENT DOCUMENTS

EP    0512714 A1    11/1992

(Continued)

*Primary Examiner*—P. Austin Bradley
*Assistant Examiner*—Edwin A. Leon
(74) *Attorney, Agent, or Firm*—Wolf, Greenfield & Sacks, P.C.

(57) ABSTRACT

An electrical connector that has an array of conductors each having a contact point to make contact with a mating conductive surface. Upon engaging the contact points in a sliding manner with the mating surface, the conductors are displaced, which, in turn, tensions a loading fiber within the connector. Tensioning of the loading fiber provides a contact force between the contact points and the mating surface.

49 Claims, 7 Drawing Sheets

U.S. PATENT DOCUMENTS

| | | | |
|---|---|---|---|
| 4,462,657 A | 7/1984 | Snowdon et al. | |
| 4,463,323 A * | 7/1984 | Piper | 333/1 |
| 4,508,401 A | 4/1985 | Casciotti et al. | |
| 4,518,648 A | 5/1985 | Miyata et al. | |
| 4,568,138 A | 2/1986 | McKenzie | |
| 4,639,054 A | 1/1987 | Kersbergen | |
| 4,651,163 A | 3/1987 | Sutera et al. | |
| 4,710,594 A | 12/1987 | Walling et al. | |
| 4,741,707 A | 5/1988 | Mondor, III | |
| 4,753,616 A | 6/1988 | Molitor | |
| 4,755,422 A * | 7/1988 | Headrick et al. | 442/7 |
| 4,778,950 A | 10/1988 | Lee et al. | |
| 4,813,881 A | 3/1989 | Kirby | |
| 4,820,170 A | 4/1989 | Redmond et al. | |
| 4,820,207 A | 4/1989 | Zic | |
| 4,929,803 A | 5/1990 | Yoshida et al. | |
| 4,940,426 A | 7/1990 | Redmond et al. | |
| 4,956,524 A | 9/1990 | Karkow | |
| 5,015,197 A | 5/1991 | Redmond et al. | |
| 5,070,605 A | 12/1991 | Daglow et al. | |
| 5,073,124 A | 12/1991 | Powell | |
| 5,109,596 A | 5/1992 | Driller et al. | |
| 5,163,837 A | 11/1992 | Rowlette, Sr. | |
| 5,176,535 A | 1/1993 | Redmond et al. | |
| 5,190,471 A | 3/1993 | Barile et al. | |
| 5,273,438 A | 12/1993 | Bradley et al. | |
| 5,281,160 A | 1/1994 | Walkup et al. | |
| 5,447,442 A | 9/1995 | Swart | |
| 5,468,164 A | 11/1995 | Demissy | |
| 5,469,072 A | 11/1995 | Williams et al. | |
| 5,533,693 A | 7/1996 | Abildskov | |
| 5,565,654 A | 10/1996 | Zell et al. | |
| 5,635,677 A | 6/1997 | Wood et al. | |
| 5,645,459 A | 7/1997 | Fitting | |
| 5,676,571 A | 10/1997 | Matthews | |
| 5,880,402 A | 3/1999 | Nugent | |
| 5,899,755 A | 5/1999 | Kline | |
| 5,899,766 A | 5/1999 | DeFeo | |
| 6,102,746 A | 8/2000 | Nania et al. | |
| 6,135,783 A | 10/2000 | Rathburn | |
| 6,210,771 B1 | 4/2001 | Post et al. | |
| 6,250,966 B1 | 6/2001 | Hashimoto et al. | |
| 6,264,476 B1 | 7/2001 | Li et al. | |
| 6,313,523 B1 * | 11/2001 | Morris et al. | 257/696 |
| 6,439,894 B1 | 8/2002 | Li | |
| 6,471,555 B1 | 10/2002 | Creze | |
| 6,762,941 B1 | 7/2004 | Roth | |
| 6,852,395 B1 * | 2/2005 | Dhawan et al. | 428/196 |
| 2002/0016108 A1 | 2/2002 | Creze | |
| 2002/0117791 A1 | 8/2002 | Hembree et al. | |
| 2003/0176083 A1 | 9/2003 | Li et al. | |

FOREIGN PATENT DOCUMENTS

| | | |
|---|---|---|
| EP | 0 901 191 A2 | 3/1999 |
| EP | 0 932 172 A2 | 7/1999 |
| JP | 6 118 818 | 8/1986 |
| JP | 6 176 624 | 6/1994 |
| JP | 6 251 819 | 9/1994 |
| JP | 7 037 433 | 2/1995 |
| JP | 8 106 939 | 4/1996 |
| WO | WO 95/08910 | 3/1995 |
| WO | WO 01/75788 A1 | 10/2001 |

* cited by examiner

ELECTRICAL CONNECTOR

This patent application claims priority to and is a continuation-in-part of pending U.S. patent application Ser. No. 10/985,322, filed Nov. 10, 2004, which is a continuation-in part of U.S. patent application Ser. No. 10/850,316, filed May 20, 2004 and now published under publication no. 2004-0214454 A1, which is a continuation-in-part of U.S. patent application Ser. No. 10/603,047, filed Jun. 24, 2003 now U.S. Pat. No. 6,951,465 and now published under publication no. US 2004-0005793 A1, which is a continuation-in-part of U.S. patent application Ser. No. 10/375,481, filed Feb. 27, 2003 and now published under publication no. US 2004-0048500 A1, which is a continuation-in-part of U.S. patent application Ser. No. 10/273,241, filed Oct. 17, 2002 now U.S. Pat. No. 6,942,496 and now published under publication no. US 2003-0134525 A1, which claims the benefit of U.S. provisional patent application Ser. No. 60/348,588 filed Jan. 15, 2002. Each of the above identified references are hereby incorporated by reference in their entirety.

BACKGROUND

1. Field of Invention

The invention relates to electrical connectors.

2. Discussion of Related Art

Electrical connectors are used to provide a separable path for electric current to flow between components of an electrical system. To provide a reliable connection, conductors of the connector may be held against a mating surface by a contact force in a direction normal to the mating surface. Greater contact forces can provide for a more reliable electrical connection by preventing separation of the conductor and the mating surface. Additionally, higher normal contact forces can cause wiping action between the conductor and the mating surface, when they are engaged in a sliding manner. This wiping action can help remove debris that might be on the conductor or mating surface, which might otherwise reduce the reliability of the connection. Wiping action can also help break oxide layers that can limit conductivity. However, there can be drawbacks to high normal contact forces. Higher contact forces can substantially increase the insertion force required to engage the connector with the mating surface. An operator, attempting to overcome such high insertion forces, may damage the connector. Additionally, the wiping action associated with higher contact forces can cause wear of the conductor and/or mating surface, including removal of desirable coatings, which can lead to oxidation and poor electrical connections.

Electrical connectors are known to use conductors that are displaced under an elastic load during engagement with a mating surface to provide contact forces. However, applicant appreciates that requiring the conductor to be optimized for both transmitting a current and applying a contact force in this manner often requires compromises to be made when choosing materials or configurations for conductors. By way of example, applicant appreciates that high conductivity copper alloys, which have desirable electrical properties, are avoided for use in electrical connectors because of stress relaxation and creep that may occur over time or repeated use. High conductivity copper alloy, as the term is used herein, refers to alloys that have at least 90% of the conductivity of metals made of 99.99% copper. Attempts to improve the mechanical properties of copper with small quantities of alloying agent, such as 0.5% Beryllium, can reduce the conductivity of the alloy to as low as 20% of the conductivity of pure copper.

SUMMARY OF INVENTION

According to one aspect, an electrical connector is provided. The connector includes an array of conductors each having a contact point to make contact with a mating surface. Upon engaging the contact points in a sliding manner with the mating surface, the conductors are displaced, which, in turn, tensions a loading fiber within the connector. Tensioning of the loading fiber provides a contact force between the contact points and the mating surface.

According to one aspect of the invention, an electrical connector comprises a base and at least one conductor connected to the base. The conductor is adapted to be displaced relative to the base when engaged with the mating surface to establish an electrical connection between the at least one conductor and the mating surface. The connector also comprises at least one loading fiber adapted to be tensioned as conductor is displaced, so as to provide a contact force between the at least one conductor and the mating surface.

According to another aspect of the invention, an electrical connector comprises a first and a second conductor each adapted to engage a mating surface to establish an electrical connection. The connector also comprises a loading fiber adapted to be tensioned as the first and second conductors are engaged with the mating surface so as to provide a contact force between each of the first and the second and the mating surface, wherein the contact force between the first conductor and the mating surface is different than the contact force between the second conductor and the mating surface.

According to still another aspect of the invention, a method is disclosed for connecting an electrical connector. The method comprises engaging at least one conductor against a mating surface and displacing the at least one conductor relative to a base of the connector upon engagement with the mating surface. The method also comprises tensioning a loading fiber of the connector upon displacing the at least one loading fiber so as to provide a contact force between the at least one conductor and the mating surface.

Various embodiments of the present invention provide certain advantages. Not all embodiments of the invention share the same advantages and those that do may not share them under all circumstances. Further features and advantages of the present invention, as well as the structure of various embodiments of the present invention are described in detail below with reference to the accompanying drawings.

BRIEF DESCRIPTION OF DRAWINGS

The accompanying drawings are not intended to be drawn to scale. In the drawings, similar features are represented by like reference numerals. For clarity, not every component is labeled in every drawing. In the drawings.

Other aspects, embodiments and features of the invention will become apparent from the following detailed description of the invention when considered in conjunction with the accompanying figures. All patent applications and patents incorporated herein by reference are incorporated by reference in their entirety. In case of conflict, the present specification, including definitions, will control.

DETAILED DESCRIPTION

The electrical connectors of the present invention are adapted to provide an electrical connection with a mating surface, regardless of the shape of the mating surface. For example, connectors can be adapted to engage flat surfaces, concave surfaces, or other surfaces that lack portions extending from the mating surface toward the conductors. Connectors of many embodiments include a loading fiber and one or more electrical conductors. The connector is arranged, such that upon engagement with the mating surface, the conductor is displaced toward the loading fiber, thereby tensioning the loading fiber. Tensioning of the loading fiber, in turn, resists the movement of the conductors and in doing so, provides contact forces between the conductors and the mating surface.

Embodiments of the electrical connector allow materials with optimal electrical characteristics to be used as conductors, and materials with optimal mechanical properties to provide contact forces between the conductors and mating surface. Although the conductors of the electrical connector may flex or otherwise move when the connector is engaged with a mating connector, they are not required to provide the contact force—thus allowing the conductors to be chosen primarily for electrical properties instead of a combination of electrical and mechanical properties. Similarly, the loading fibers and associated loading elements can be used within the conductor primarily to provide a mechanical contact force between the conductors and the mating surface. In this regard, the loading fiber and associated loading elements can be chosen primarily for their mechanical characteristics.

Figure 1:
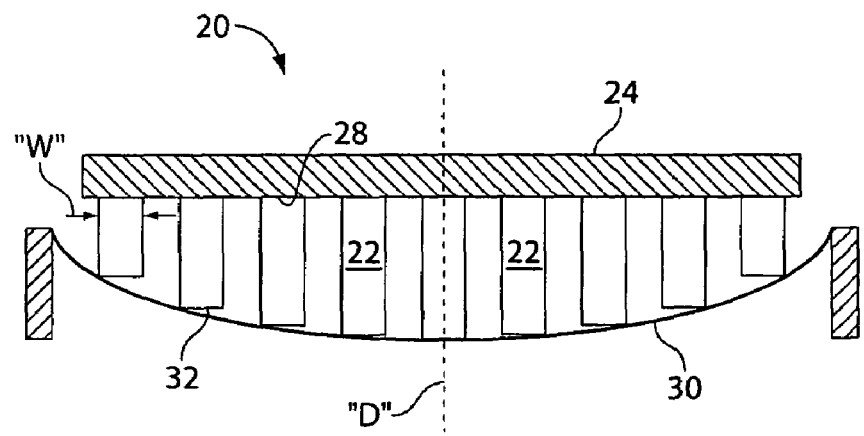
FIG. 1 is schematic representation of an electrical connector having an array of conductors contacting a substantially flat mating surface and a loading fiber that is tensioned to provide contact forces between the conductors and the mating surface.

Turn now to the figures, and initially FIG. 1, which shows a cross-sectional schematic of a connector 20 having an array of conductors 22 in contact with a flat mating surface 24. In this illustrative embodiment, the conductors have different depths 26, as taken along axis "D" in FIG. 1, between their contact surface 28 and loading fiber interface 32. Together, the different depths 26 of the conductors define a convex or crowned interface between the array of conductors and the loading fiber 30 when the array is in contact with the flat mating surface. This crowned interface allows the loading fiber to provide appropriate contact forces to each conductor of the array in directions normal to the mating surface and thus to each contact point of the electrical connector.

Figure 2:
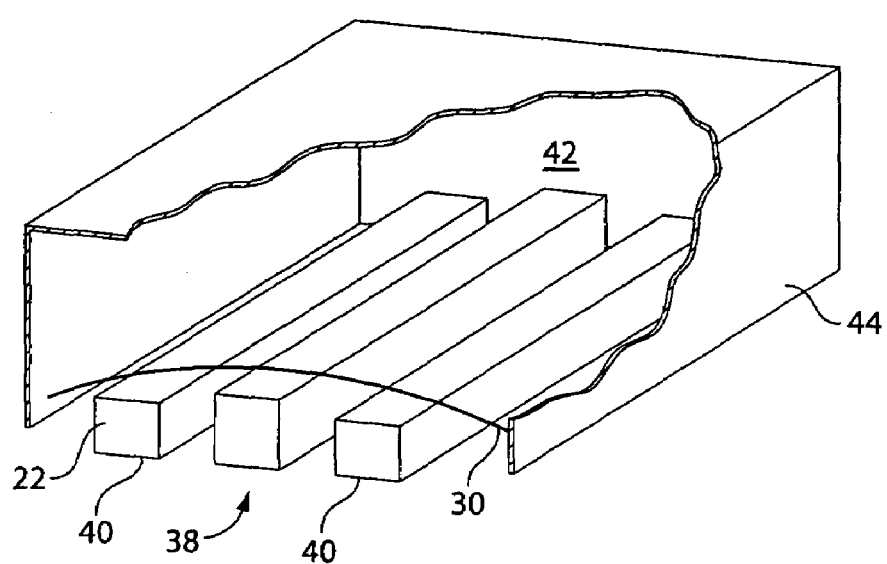
FIG. 2 is perspective representation of portions of an electrical connector of FIG. 1.

FIG. 2 shows one embodiment of a connector 20 that is schematically represented by FIG. 1. In this particular embodiment, conductors 22 of the array 38 are brought into sliding contact with the mating surface during engagement of the connector. In the embodiment of FIG. 2, the array is arranged such that the contact points 40 of each of the conductors are roughly aligned in a direction perpendicular to the direction of sliding engagement (e.g., the array of FIG. 1 moves into or out of the page, relative to the mating surface, during engagement). However, it is to be appreciated that aspects of the invention are not limited in this respect, as engagement can occur in manners other than sliding, such as by clamping, and in directions other than those represented by the embodiment of FIG. 2.

Some illustrative embodiments of the invention with conductors that engage a mating surface in sliding contact can benefit when the conductors are arranged to be displaced in a direction that is not parallel to the direction of sliding contact. Further, in some embodiments the conductors may be displaced in a direction that is perpendicular to the direction of sliding engagement along the mating surface. Connectors arranged in this manner can prevent friction that acts in the direction of sliding from affecting the contact forces of associated conductors. It is to be appreciated that not all conductors engage with the mating surface in sliding contact, and those connectors that do engage the mating surface in sliding contact are not required to do so in a direction perpendicular to the direction that the conductors are displaced, as the present invention is not limited in this regard.

Individual conductors of an array can be constructed in various ways to allow the conductors to move or flex upon engagement of the electrical connector. By way of example, the conductors shown in FIG. 2 are each connected to a base 42 of the connector. In the illustrated embodiment, the base comprises two portions of a connector housing that together clamp an end of each conductor. In this regard, the base provides structural support to the conductors and allows the conductors to be displaced upon engagement with the mating surface. This connection between the base and the conductors allows the conductors to move toward and away from the mating surface. It is to be appreciated that in other embodiments, the individual conductors can be arranged to move or flex within the housing through other ways. For instance, some embodiments can have conductors adapted to slide within individual tracks in the base. Other embodiments may have conductors anchored at either end that are adapted to flex or stretch upon engagement with the mating surface. Still, other constructions that allow for movement of the conductor are possible, such as embodiments with conductors that pivot, as the present invention is not limited to the above described constructions. It is also to be appreciated that the base may include any other suitable feature that supports the conductors and that allow the conductors to be displaced upon engagement with the mating surface. Additionally, it is to be appreciated that the base may be conductive, or non-conductive, as the present invention is not limited in this regard.

In many embodiments the mechanical properties of individual conductors, such as the flexing characteristics of conductors that are cantilevered, as shown in FIG. 2, do not contribute significantly to the associated contact force of the conductor. However, in other illustrative embodiments, the forces associated with flexing or otherwise moving of individual conductors can contribute to the contact force, even substantially. Whether the flexing or movement of the conductors contributed to the contact force with the mating surface often depends on the material that comprises the conductors. By way of example, the cantilevered conductors of FIG. 2, may in some embodiments be made of a material that is stiff enough to contribute to the contact force during engagement. Still, in other embodiments, such as those having conductors that slide or pivot relative to the base of the connector during engagement, the conductors may be compressed during engagement and thus contribute to the contact force through their elastic compression.

Figure 3:
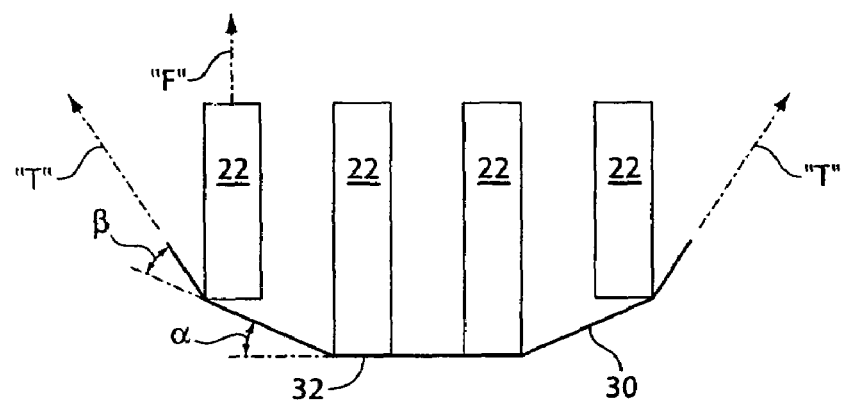
FIG. 3 is a schematic representation showing the forces applied to the connector of FIG. 1.

FIG. 3 is a diagram showing the geometric relationship between a loading fiber 30 and an array of conductors 38, according to one illustrative embodiment, such as the embodiment represented in FIG. 1. When the connector is engaged with a flat mating surface 24, the conductors are each displaced into the loading fiber. In the engaged state, the loading fiber takes on a shape defined by the overall geometry of the displaced conductors 38. As is to be appreciated, the amount that the conductors are displaced affects how far the loading fiber and/or elastic elements that the loading fiber is connected to are displaced, which in turn can affect the magnitude of contact forces. Displacements for the conductors of some illustrative embodiments are between 0.005" and 0.020", although aspects of the invention are not limited to displacements in this range. The contact forces are then defined by the geometric arrangement of conductors of the array relative to the loading fiber.

Factors within a connector, other than the amount of displacement of each conductor in the array, can also affect the contact force associated with each conductor. For instance, the geometry of the loading fiber with respect to the interface of a conductor can affect the tension and the contact force as represented in the figures by the letters "T" and "F", respectively. As is also represented by FIG. 3, the contact force of each conductor can be affected by the angles α and β and as represented in Eq. 1 below:

$$F = T \cdot \sin(\alpha + \beta) - T \cdot \sin(\alpha) \qquad \text{Eq. 1}$$

where:
F=Contact Force of a given conductor;
T=Tension of the loading fiber;
α=Angle between the loading fiber on a given conductor and the direction of displacement for the given conductor
β=Change in angle of the loading fiber over the back of the conductor As mentioned above, the displacement that conductors of a connector undergo during engagement, from their initial position to their engaged position, can affect the associated contact forces. The position of conductors in a connector prior to engagement can be determined by various factors. The conductors of some embodiments can be biased against the loading fiber when the connector is not engaged. In this regard, biasing of the conductors can set the initial position of the conductors. In some embodiments, the loading fiber can be pre-tensioned in this manner. In other embodiments, the connector structure can have features that prevent the conductors from moving away from the loading fiber and thus help to set the initial position of the conductors. In other embodiments, the interface between the loading fiber and the conductors can include features that help hold the conductors in position prior to engagement. Still, in other embodiments the conductors may be allowed to move away and separate from the loading fiber when the connector is not engaged with the mating surface. In such embodiments, movement of the conductors that does not also move the loading fiber will not affect the magnitude of the contact force between the conductor and mating surface except the force caused by the elastic deformation of the conductor itself. It is to be appreciated that the invention can include other arrangements, as the present invention is not limited to those described above.

Figure 4A:
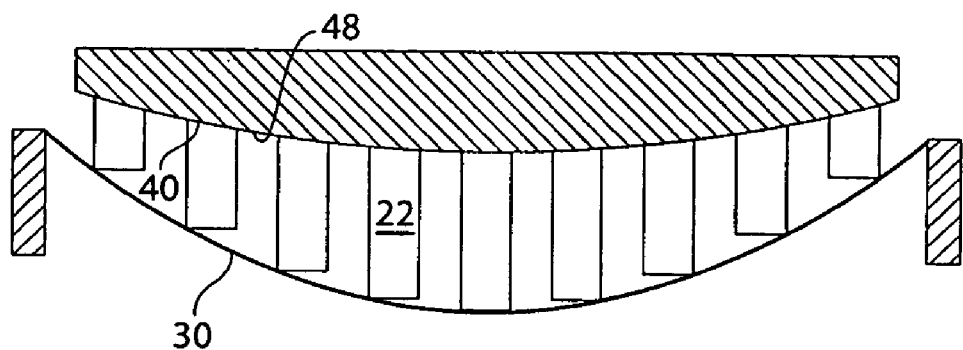
FIGS. 4a–4b shows various forms of portions of mating surfaces that may engage with the connector to provide an electrical connection.
Figure 4B:
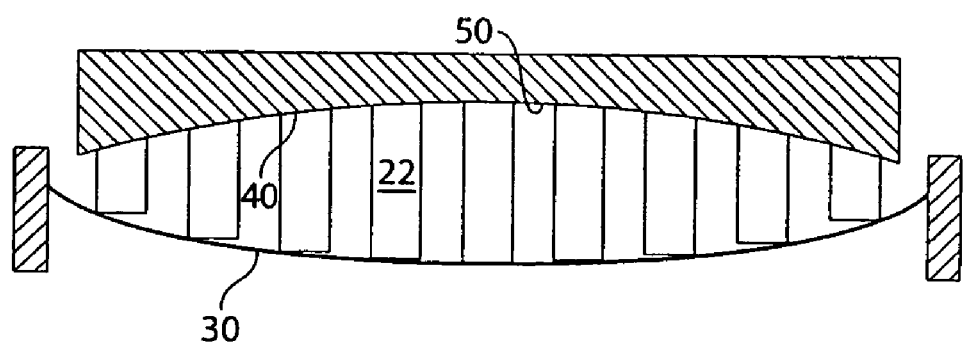

As is to be appreciated, the shape of the mating surface 24 can affect the engaged position of each of the conductors 22, and thus the amount that each conductor is displaced during engagement with the mating surface. By way of example, a flat surface, as shown in FIGS. 1 and 3, will align the contact points of each conductor in a plane when engaged. This will create a shape across the interface points 32 of the conductor that is dependent on the depth of each conductor, such as the convex shape shown in FIGS. 1 and 3. However, if a similar connector is engaged with a convex mating surface 48, the convex nature of the interface surfaces will be exaggerated, as shown in FIG. 4a. If the same connector is engaged with a concave mating surface 50, as shown in FIG. 4b, the convex nature of the interface surface may be reduced to some degree. To address this, the depth of each conductor in the array can be chosen with a particular mating surface in mind. Alternately, the array can be chosen such that it can provide a reliable electrical connection with a variety of mating surface shapes that it could conceivable be used with in combination.

The geometry of individual conductors 22 within an array can affect the contact force associated therewith. As may be appreciated, widening an individual conductor, or otherwise altering the spacing with adjacent conductors, can alter either or both of the angles α and β, such that the resulting force in the conductor is affected. Such changes may be accomplished by changing the width (as represented by dimension 'W' in FIG. 1) along the entire conductor, or by solely changing the width of the conductors at the interface with the loading fiber. By way of example, some conductors may have a greater width at the interface 30 with the conductor 22 and a narrower width at the contact point 40 with the mating surface 24. In this regard, the interface with the loading fiber 30 may be chosen to affect the magnitude of the contact force, while the geometry of the contact point is chosen for other characteristics, such as to affect the pressure between the conductor and the mating surface.

The geometric characteristics of the individual conductor 22 can be altered in other ways to affect the contact force of a conductor upon being engaged with a mating surface. As previously discussed, the overall width between the contact point 40 and the interface 32 can affect the angles, α and β, such that the resulting conductor force is affected. As is to be appreciated from Eq. 1 above, increasing angle β, or decreasing angle α, results in a greater contact force in a corresponding conductor.

Figure 5A:
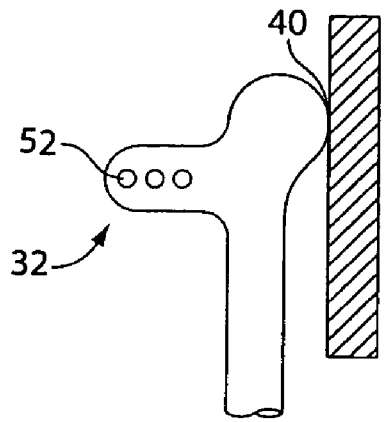
FIGS. 5a–5d show alternate interfaces between a loading fiber and a conductor, according to various embodiments.

Conductors can include features that facilitate multiple, potential interfaces 32 with a loading fiber 30. For instance, FIG. 5a depicts one embodiment of a conductor having multiple apertures capable of accepting a loading fiber. Here, the loading fiber can be placed through different apertures 52 during manufacturing to achieve different conductor depths and thus different loading characteristics for the corresponding conductor. Apertures, like those illustrated, can also allow the loading fiber to hold the conductor in place when the connector is not engaged with a mating surface, although this can also be accomplished by other features in the connector as well.

Figure 5B:
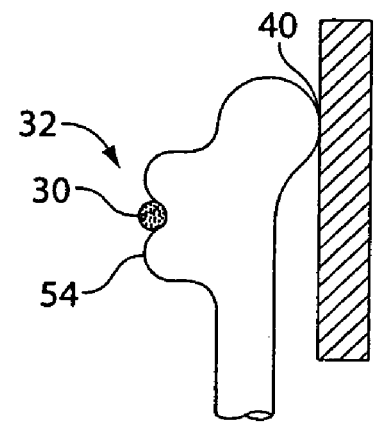
Figure 5C:
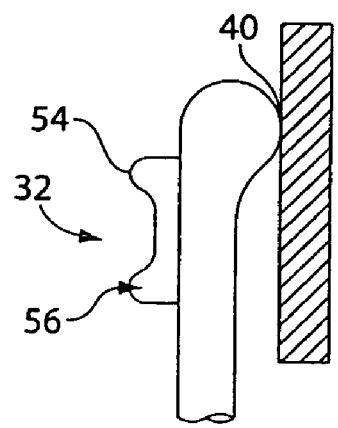

Conductors within the array may also have features to facilitate movement relative to the loading fiber. As may be appreciated, the loading fiber 30, in some embodiments, may slide against the conductor 22 as the conductor is displaced during engagement. The interface can have features to minimize wear and/or friction between the loading fiber and conductor. Such features can include rounded edges 54, as shown in FIGS. 5b and 5c. Embodiments of conductors can also include low friction materials at the interface. The low friction material can be the material of the conductor itself, the loading fiber, or it can include an additional element 56, either conductive or non-conductive, such as the spacer shown in FIG. 5c. Still, in other embodiments, coatings or lubricants may be applied to the loading fiber and/or interface to reduce friction and/or decrease wear. However, it is to be appreciated that not all embodiments of the invention include such features, and that in some embodiments, a certain amount of friction may be desired.

Figure 5D:
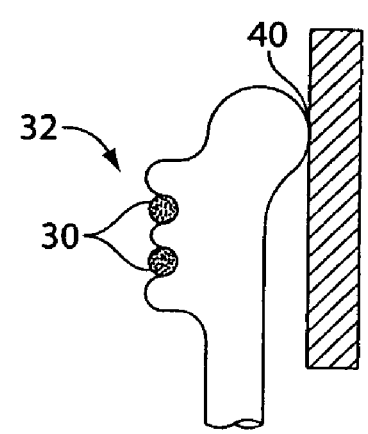

Embodiments of the connector can have more than one loading fiber 30 to accomplish various effects. FIG. 5d shows an interface surface 32 of a conductor that is adapted to contact a pair of loading fibers. Here, the dual loading fibers can be used to provide a greater contact force for a given displacement of the conductor. In other embodiments, dual loading fibers may be incorporated into the connector differently. For instance, each one of multiple loading fibers may be associated with only a subset of the conductors in a given array. In other embodiments, the conductors may be arranged in two arrays 38 that are separate from one another. In such embodiments, the two separate arrays of conductors, each associated with separate loading fibers, can provide redundant sets of contact points 40. Still, in other embodiments, conductors can each have multiple contact points associated therewith. In such embodiments, multiple loading fibers can be associated with each of the conductors to help provide contact forces to each of the contact points.

As discussed herein, adjustments may be made such that the contact forces associated with individual conductors can be altered relative to other conductors in the array. Additionally, features can be altered within a design to affect the overall magnitude of the contact force profile. By way of example, the effective spring constant associated with the tensioning of the loading fiber can be increased to, in turn, increase the average contact force of the conductors in the array. In another example, the average distance that each conductor is displaced during engagement may be increased to increase the amount of tension exhibited by the loading fiber when engaged with the mating surface and thus to increase the overall contact force. Still, other methods and features can be used to adjust the average contact force of the array of conductors to suit a particular application.

In embodiments having multiple conductors, the force profile between the contact points of the conductors and the mating surface can be suited for particular applications. By way of example, in some embodiments it may be beneficial for each conductor of the array to be associated with a substantially similar contact force. In other embodiments, the force profile across an array of conductors may vary in a regular manner, such as in a parabolic manner, from one end of the array to the other. In other embodiments, the force profile may vary in an irregular manner from one end of the array to the other, as the invention is not limited in this regard.

Embodiments having different contact forces from conductor-to-conductor of an array can provide benefits for some applications. By way of example, it can be beneficial to have different contact forces for conductors that are made of different materials within a connector. In some embodiments, it can also be beneficial to have contact forces vary from conductor to conductor in an array such that the conductors can undergo different types of wiping action with the mating surface during engagement. In this regard, if a conductor with a higher contact force happens to cause excessive wear, those conductors with lower contact forces may not be associated with the excessive wear and thus remain capable of maintaining a reliable connection.

As discussed herein, constructing the connector with a loading fiber to provide contact forces, instead of having the conductors themselves provide the contact force, allows the conductors to be made of a material that has optimal electrical properties. By way of example, high conductivity copper alloys can be used in embodiments of the present invention, without concerns of the material being unable to provide an adequate contact force over time or after repeated cycles of dis-engagement and re-engagement. However, it is to be appreciated that embodiments of the present invention are not limited to having conductors made of high conductivity copper alloys, and that other conductive materials, such as other copper alloys, aluminum, gold and the like may be suitable as well.

The loading mechanism of the connector, such as the loading fiber and/or elastic elements, may also be chosen with optimal mechanical characteristics in mind—rather than compromising for a mechanism or material that has both appropriate mechanical and electrical properties. As discussed herein, the loading fibers are not required to carry an electrical current within the connector. In this regard, the loading fiber and any other features of the connector that help provide the contact force, may be chosen with the mechanics of the connector in mind.

Various mechanism maybe used to provide elasticity to the loading fiber. In one illustrative embodiment, as shown in FIG. 2, the loading fiber 30 is made of an elastic material so that the loading fiber itself can stretch to allow displacement of the conductors as the loading fiber is tensioned. Still, other materials and constructions may be used as the invention is not limited to those listed above.

In some illustrative embodiments, the loading fiber is made of an inextensible material, that can be displaced by virtue of other elements within the connector that have elastic properties. By way of example, the loading fiber may be made of nylon, fluorocarbon, polyaramids and paraaramids (e.g., Kevlar®, Spectra®, Vectran®, polyamids, conductive metals and natural fibers, such as cotton, and the like. In one such embodiment, the loading fiber is connected at one or both ends to one or more elastic elements. The elastic element can include any suitable feature for providing an elastic force, such as coiled wire spring, a U-spring, or any other type of spring. In yet another example, one or more walls of the connector housing can act as cantilevers that are displaced elastically as the loading fiber is tensioned by the displacement of the conductors. Although a few examples of tensioning mechanisms are mentioned, it is to be understood that others may be suitable as well, and that the invention not limited to those listed above. Additionally, some embodiments may have both a loading fiber with elastic properties, and elastic elements within the connector that can be displaced elastically as the fiber is tensioned.

The loading fiber may include features suitable for particular applications. In some illustrative embodiments, the loading fiber comprises an electrically conductive material. In this regard, the loading fiber can provide an additional pathway for current flow through the connector. In some embodiments, the loading fiber can comprise a band or strap, rather than a strand with a substantially circular cross section as shown in many of the figures. In some embodiments, it can be desirable to have a loading fiber that primarily extends along the longitudinal axis of the fiber when the conductors are displaced. In such embodiments, the tension in the loading fiber can be calculated in a straightforward manner by knowing how far the loading fiber is extended, or equivalently, how far the elastic element connected to the loading fiber is extended.

Figure 6:
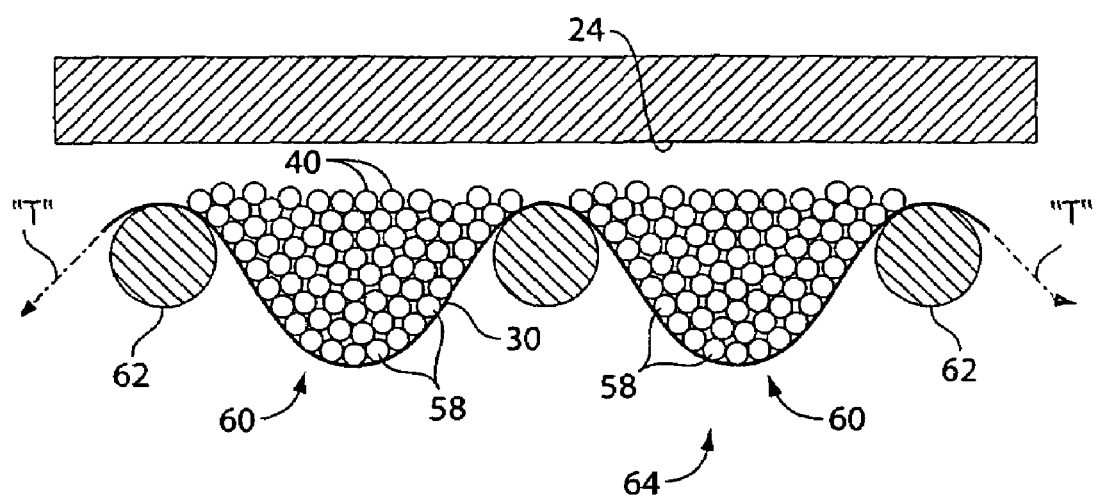
FIG. 6 is a schematic representation showing an alternate embodiment of the connector that has wire bundles as conductors.

In some illustrative embodiments, such as the embodiment shown in FIG. 6, the conductors of the array each comprise multiple wire conductors 58 gathered in a bundle 60. Wire bundles of this nature can be more flexible, for a given cross-sectional area, than some other constructions of conductors. This can be a desirable feature in applications where contributions to the contact force from the conductor itself are to be minimized. The wire bundles can also provide numerous contact points 40 or lines of contact for each wire bundle, which can increase the reliability of the connection between the conductor and the mating surface.

Many of the previously discussed features of the electrical connector discussed herein also apply to embodiments that have wire bundles as conductors. Additionally, embodiments that have wire bundles as conductors can benefit from features that control contact characteristics between the wire bundles and the mating surfaces. In one illustrative embodiment, as shown in FIG. 6, the wire bundles are interleaved between rigid posts 62 of the connector structure. Here, the loading fiber or fibers 30 are passed around one side of the posts 62 and opposite sides of the wire bundles 60 as illustrated. Upon engagement with the mating surface, the wire bundles are displaced, which, in turn, presses the wire bundles farther into the gaps 64 between the posts to tension or further tension the loading fiber or fibers.

As may be appreciated, the individual wires 58 in any given bundle 60 may be held together through various means. In some embodiments, the bundles are braided together or are twisted together. In other embodiments, the wires are held together by a strand wrapped around the wire bundle. Still, in other embodiments, the wire bundles may be clamped in the housing at one or more positions to hold the individual wires of a bundle together. It is to be appreciated that other features may also be used to hold the wires together, such as set screws, soldering, crimping, and the like.

Figure 7:
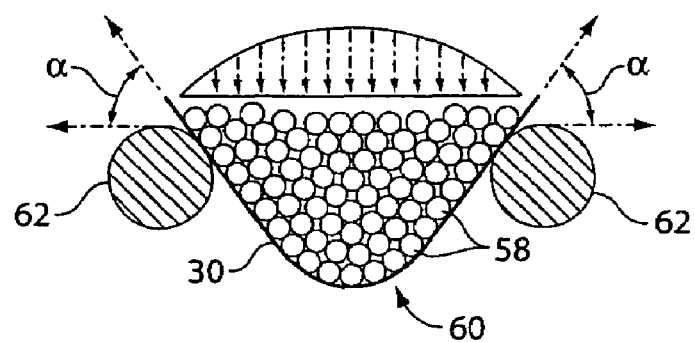
FIG. 7 is a schematic representation showing the forces applied to the connector of FIG. 6.

The contact between each of the wire bundles in an embodiment like that of FIG. 6 and a mating surface is characterized by a statistically averaged pressure distribution, as illustrated in FIG. 7. Here, the net force applied across the contact area of a wire bundle can be estimated with Eq. 2 below.

$$F = 2T \cdot \sin(\alpha) \quad \text{Eq. 2}$$

where:
F=Contact Force between wire bundle and mating surface
T=Tension of the loading fiber
$\alpha$=angle between loading fiber and plane lying orthogonal to mating surface, as represented by FIG. 7

As is to be appreciated, the contact force between the mating surface and any given wire bundle of an array of conductors can be altered with many of the techniques described herein with respect to other embodiments. By way of example, individual wire bundles of an array can be constructed such that, upon engagement with the mating surface, the angle of the loading fiber at its tangency to the rigid post, in this case angle $\alpha$, is different from one wire bundle to another. This may be accomplished by various approaches, including but not limited to altering the amount of wires in a given bundle, altering the spacing between wire bundles, and altering the distance that a bundle is displaced upon engagement with a mating surface.

Wire bundles have characteristics that may be useful for connectors of particular applications. For instance, the number of wires in a given bundle may be increased to add stiffness to a wire bundle, to increase the contact force associated with the bundle as described above, and/or to prevent a wire bundle from flattening out too much upon engagement with a mating surface. Similarly, the spacing between posts of a connector may be reduced to increase the contact force associated with a wire bundle located therebetween, and/or to help prevent a wire bundle from spreading out too far upon engagement, which may result in a lower a angle and an associated lower contact force. Still, other factors can be considered when defining characteristics of the conductor, such as the current carrying requirements of a particular application, which can be increased by increasing the net cross-sectional area of one or more wire bundles.

Figure 8:
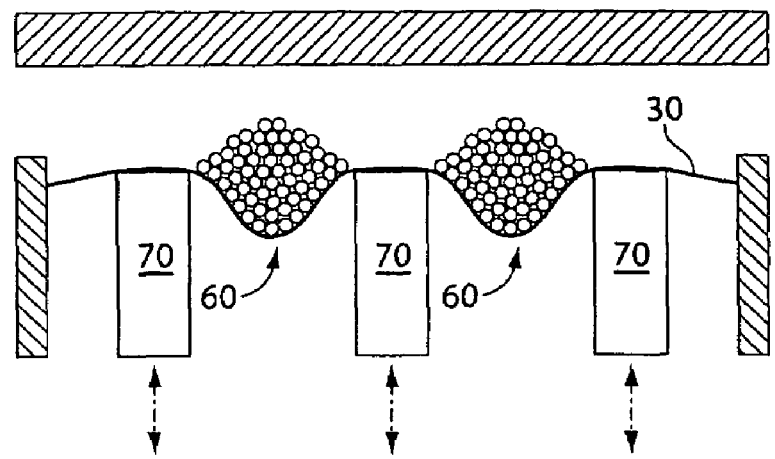
FIG. 8 is a schematic representation showing an alternative embodiment of the connector having wire bundles interleaved between movable posts.

In one illustrative embodiment, as shown in FIG. 8, the posts 70 interleaved between conductors of the connector are movable, rather than rigidly attached to the connector structure. In the embodiment of FIG. 8, the loading fiber 30 is made of an inextensible material and is also attached to a rigid portion of the connector housing. In this regard, as the posts move to accommodate the displacement of the conductors, the loading fiber is tensioned. In some embodiments, particularly those having inextensible loading fibers, the movement of the posts 70 alone allows displacement of the fibers. However, in other embodiments, the additional elastic features, such as the loading fibers themselves, or other spring elements connected to the loading fibers can be used in combination with the movable posts to allow displacement of the conductors.

Spring forces can be provided to the moving posts through various mechanisms. By way of example, the floating posts can be cantilevered beams extending from the connector base. In other embodiments, the floating posts may be arranged to slide relative to the base, and have a spring element that biases them toward the mating surface when engaged. Still, other means may be used to provide a spring force, as the invention is not limited in this regard.

Figure 9:
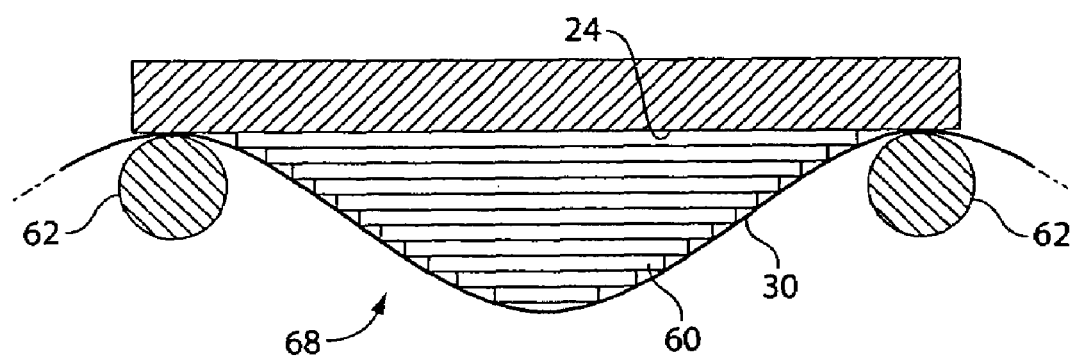
FIG. 9 is a schematic representation showing another alternative embodiment of the connector having layers of foil as conductors of an array.

In some illustrative embodiments, such as the embodiment shown in FIG. 9, the conductors of the array each comprise layers of metal, or foil 66, that form the individual conductors of an array. As illustrated, the layered foil conductors 68 are used in a connector embodiment having rigid posts interleaved between the connectors, as described above. However, it is to be appreciated that many other features of connector embodiments described herein can be used in conjunction with layered foil conductors, as they are not limited to being used in conjunction with rigid posts.

In some illustrative embodiments, the load carrying capacity of a layered foil conductor 68 can be increased by increasing the cross sectional area of the conductor by increasing its depth and/or width. Additionally, increasing the overall depth of the layered foil conductor can provide increased resistance to bending, so as to assist the loading fiber in providing a contact force, which can be desirable for some applications.

Embodiments having layers of foil can exhibit advantageous bending characteristics. That is, some illustrative embodiments, the conductors are more readily flexed about an axis parallel to their width when engaged with a mating surface, and are less prone to spreading out in lateral directions, to bending, or twisting in other manners. Additionally, in some embodiments, the shape or structure of the layered foil may be altered by including additional materials. For example, in some embodiments insulating layers are incorporated into the layers of conductive foil to build up a desired shape for the conductor or to impart desired electrical characteristics, such as the capacitance or impedance of the conductor. Some examples of materials that can be used in this manner include KAPTON, polyimide, polyester, and the like.

It is to be appreciated that embodiments of the present invention can be adapted for use in a wide variety of applications. Some of the more prevalent applications include power and data transmission. A connector housing may include multiple arrays of conductors, each used to transmit power or data, or combinations of arrays used for either purpose. Additionally, conductors within a given array may be connected to a common conductor within the housing, or may be connected to individual conductors within the housing that are used for similar or different purposes. It is to be appreciated that variations, such as those mentioned above, and others, can be made without departing from aspects of the invention as those of skill will appreciate.

Figure 10:
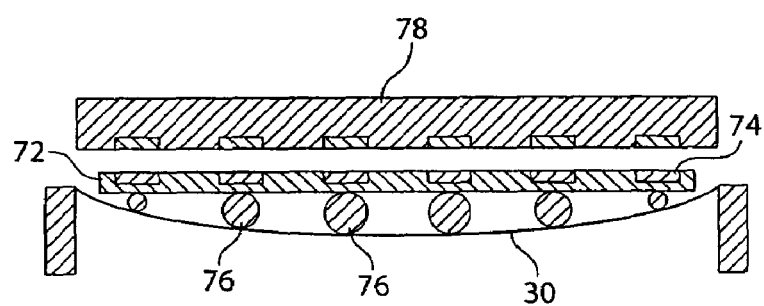
FIG. 10 is a schematic representation showing yet another alternative embodiment of the connector.

One example of a connector that is included within the present invention is a data connector, as shown in FIG. 10. Here, a flexible board 72, including multiple conductive traces 74, acts as an array of conductors. The array is engaged by pins 76 that are in contact with the loading fiber which may have depths different from one another. Upon engagement with a mating surface, which can include a printed circuit board 78 as shown in FIG. 10, the pins displace the loading fiber 30 thereby tensioning the fiber, which, in turn, provides a contact force to the pins, and thus between the traces of the array and the mating surface. It is to be appreciated that the pins may be rigid, with the loading fiber or other elastic features of the connector allowing for displacement. Still, in some embodiments, the pins themselves may be elastically compressed instead of, or in combination with other features of the connector.

Having thus described certain embodiments of an electrical connector, various alterations, modifications and improvements will readily occur to those skilled in the art. Such alterations, modifications, and improvements are intended to be within the spirit and scope of the invention. Accordingly, the foregoing description is by way of example only, and not intended to be limiting. The invention is limited only as defined in the following claims and the equivalent thereof.

The invention claimed is:

1. An electrical connector comprising:
   a base;
   at least one conductor connected to the base and displaced relative to the base when engaging with a mating surface to establish an electrical connection between the at least one conductor and the mating surface; and
   at least one loading fiber tensioned as the at least one conductor is displaced, so as to provide a contact force between the conductor and the mating surface and providing a non woven interconnection.

2. The electrical connector of claim 1, wherein the at least one conductor is positioned between the loading fiber and the mating surface when engaged with the mating surface.

3. The electrical connector of claim 1, wherein the at least one conductor is adapted to engage the mating surface in a sliding manner to establish the electrical connection.

4. The electrical connector of claim 1, wherein the at least one conductor is adapted to contact a substantially flat mating surface to provide the electrical connection.

5. The electrical connector of claim 1, wherein tensioning the loading fiber provides substantially all of the contact force between the at least one conductor and the mating surface.

6. The electrical connector of claim 1, wherein the at least one conductor is elastically displaced during engagement with the mating surface so as to contribute to the contact force.

7. The electrical connector of claim 1, wherein the loading fiber comprises an elastic material.

8. The electrical connector of claim 1, wherein the loading fiber comprises a conductive material.

9. The electrical connector of claim 1, wherein the at least one conductor is adapted to contact a concave mating surface to provide the electrical connection.

10. The electrical connector of claim 1, wherein the at least one conductor is adapted to contact a convex mating surface to provide the electrical connection.

11. The electrical connector of claim 1, wherein the loading fiber is biased against the at least one conductor prior to engagement with the mating surface, and wherein the loading fiber is biased further against the at least one conductor when engaged with the mating surface.

12. The electrical connector of claim 1, wherein the at least one conductor comprises an array of cantilevered beams.

13. The electrical connector of claim 1, wherein the at least one conductor consists of a single conductor.

14. The electrical connector of claim 1, wherein the at least one conductor is in direct contact with the loading fiber.

15. The electrical connector of claim 1, wherein the at least one loading fiber comprises multiple loading fibers.

16. The electrical connector of claim 1, wherein the loading fiber comprises a substantially inextensible material.

17. The electrical connector of claim 16, wherein the loading fiber is made of KEVLAR.

18. The electrical connector of claim 16, further comprising:
   an elastic element connected to the loading fiber that is adapted to be elastically displaced by displacement of the plurality of conductors during engagement with the mating surface.

19. The electrical connector of claim 18, wherein the elastic element is a cantilevered structure within the connector.

20. The electrical connector of claim 18, wherein the at least one conductor comprises a plurality of conductors and the elastic element includes one or more movable structures interleaved between the plurality of conductors.

21. The electrical connector of claim 20, wherein the one or more movable structures are cantilevered from the base of the connector.

22. The electrical connector of claim 1, wherein the at least one conductor is adapted to contribute insubstantially to the contact force.

23. The electrical connector of claim 22, wherein the at least one conductor comprises high conductivity copper alloy.

24. The electrical connector of claim 1, wherein the at least one conductor comprises an array of wire bundles.

25. The electrical connector of claim 24, wherein conductors of the array are separated by rigid structures.

26. The electrical connector of claim 24, wherein conductors of the array are separated by movable structures.

27. The electrical connector of claim 26, wherein the movable structures are adapted to be elastically displaced to tension the at least one loading fiber.

28. The electrical connector of claim 1, wherein the at least one conductor comprises an array of layered foil conductors.

29. The electrical connector of claim 28, wherein conductors of the array are separated by rigid structures.

30. The electrical connector of claim 28, wherein conductors of the array are separated by movable structures.

31. The electrical connector of claim 30, wherein the movable structures are adapted to be elastically displaced to tension the at least one loading fiber.

32. The electrical connector of claim 28, wherein the layered foil conductors of the array include non-conductive layers.

33. The electrical connector of claim 1, wherein the at least one conductor comprises a flexible sheet having multiple conductive traces.

34. The electrical connector of claim 33, further comprising:
elements disposed between the loading fiber and the flexible sheet, the elements adapted to be placed in compression when multiple conductive traces are engaged with the mating surface.

35. The electrical connector of claim 34, wherein the elements are substantially inelastic.

36. The electrical connector of claim 1, wherein the at least one conductor comprises a plurality of conductors, each adapted to be displaced relative to the base when engaged with the mating surface to establish electrical connections between each of the conductors and the mating surface, and wherein the loading fiber is adapted to be tensioned as the plurality of conductors are displaced, so as to provide a contact force between each of the plurality of conductors and the mating surface.

37. The electrical connector of claim 36, wherein contact points between the plurality of conductors and the mating surface are arranged in a substantially linear row.

38. The electrical connector of claim 36, wherein contact points between the plurality of conductors and the mating surface are spaced from one another in at least two directions that lie tangent to the mating surface.

39. The electrical connector of claim 36, wherein the plurality of conductors are spaced from one another in irregular intervals.

40. The electrical connector of claim 36, wherein the plurality of conductors each have different distances between the mating surface and the loading fiber when engaged.

41. The electrical connector of claim 1, wherein each of the at least one conductor has a plurality of interfaces adapted to contact the loading fiber.

42. The electrical connector of claim 41, wherein each of the plurality of interfaces is positioned a different distance from the mating surface when the connector is engaged therewith.

43. The electrical connector of claim 1, wherein the at least one conductor is adapted to engage the mating surface in sliding contact in a first direction, and further wherein the at least one conductor is adapted to be displaced relative to the base in a second direction that is non-parallel to the first direction.

44. The electrical connector of claim 43, wherein the first direction is substantially perpendicular to the second direction.

45. An electrical connector comprising:
a first and a second conductor each engaging a mating surface to establish an electrical connection; and
a loading fiber tensioned as the first and second conductors are engaged with the mating surface so as to provide a contact force between each of the first and the second conductors and the mating surface;
wherein the contact force between the first conductor and the mating surface is different than the contact force between the second conductor and the mating surface and providing a non woven interconnect.

46. The electrical connector of claim 45, further comprising:
additional conductors adapted to be engaged with the mating surface to establish electrical connections, the loading fiber adapted to provide contact forces between each of the additional conductors and the mating surface.

47. The electrical connector of claim 45, wherein the first and second conductors are adapted to engage the mating surface in a sliding manner.

48. The electrical connector of claim 45, wherein the first and second conductor are displaced substantially perpendicular to the mating surface to tension the loading fiber as the first and second conductors are engaged with the mating surface.

49. A method of connecting an electrical connector, the method comprising:
engaging at least one conductor against a mating surface;
displacing the at least one conductor with respect to a base of the connector upon engagement with the mating surface; and
tensioning a loading fiber of the connector upon displacing the at least one loading fiber so as to provide a contact force between the at least one conductor and the mating surface and providing a non woven interconnect.

* * * * *